Feb. 3, 1931.    J. W. S. HODGDON    1,790,923
AIRCRAFT
Filed July 30, 1929    2 Sheets-Sheet 1
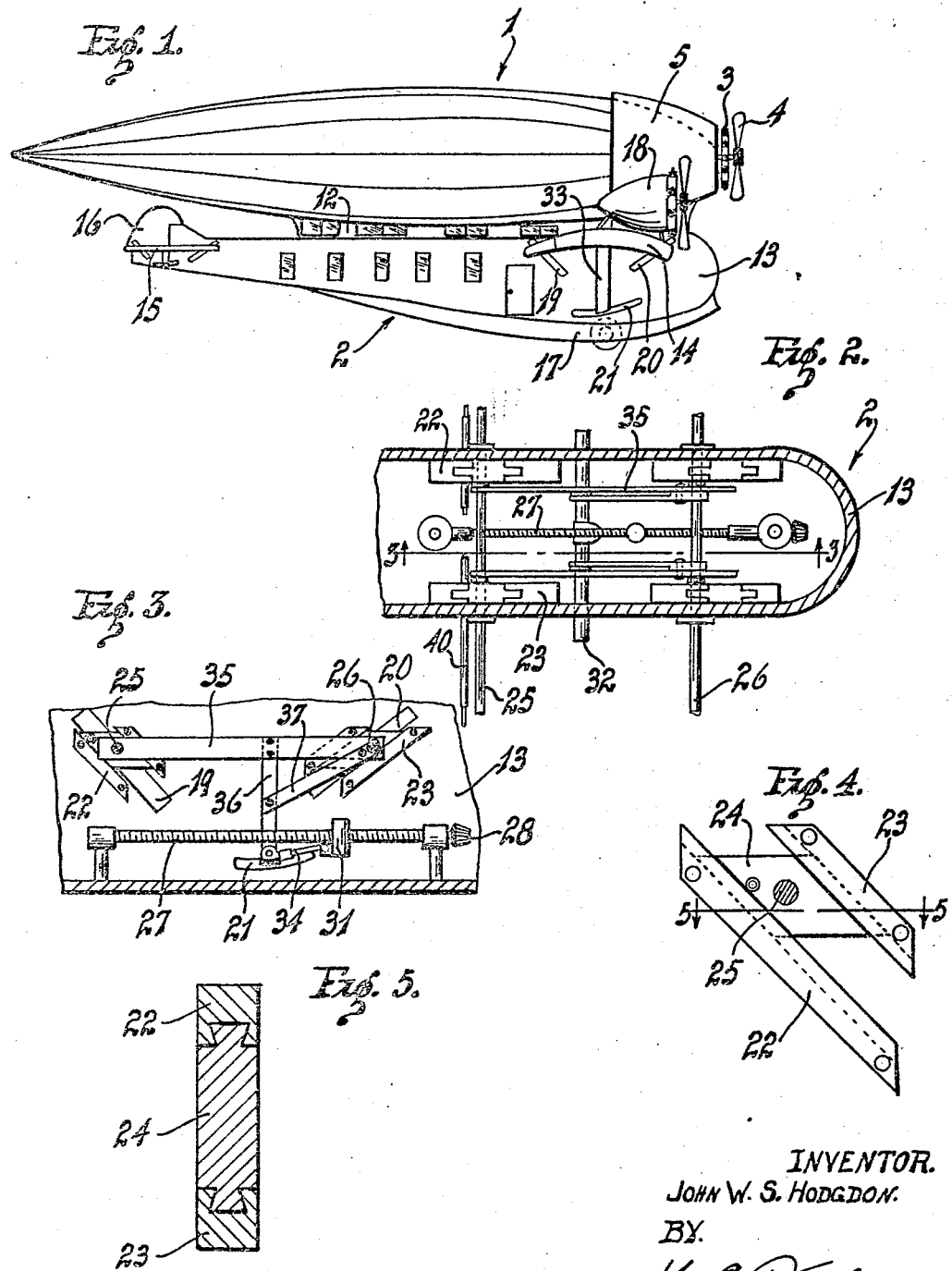
INVENTOR.
JOHN W. S. HODGDON.
BY
ATTORNEY.

Feb. 3, 1931. J. W. S. HODGDON 1,790,923
AIRCRAFT
Filed July 30, 1929 2 Sheets-Sheet 2
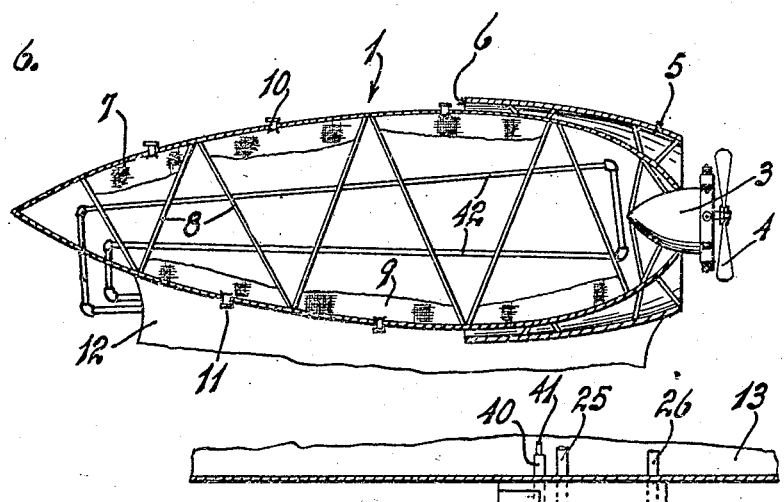
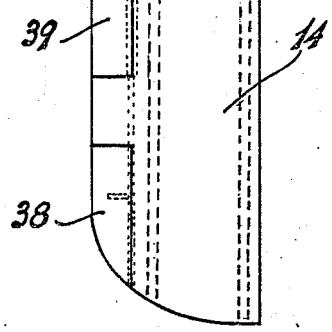
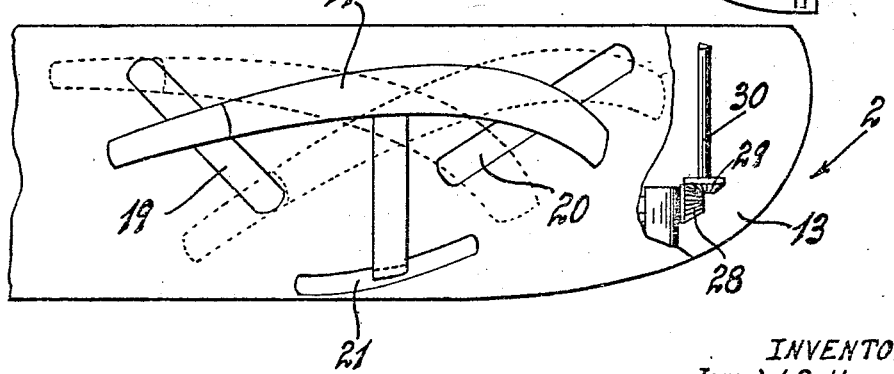
INVENTOR.
JOHN W. S. HODGDON.
BY
H. A. Duckman
ATTORNEY.

Patented Feb. 3, 1931

1,790,923

UNITED STATES PATENT OFFICE

JOHN W. S. HODGDON, OF LONG BEACH, CALIFORNIA

AIRCRAFT

Application filed July 30, 1929. Serial No. 382,147.

This invention relates to an improved aircraft construction and one object is to provide an aircraft which includes a buoyant super-structure capable of sustaining the weight of a lower airplane structure, the airplane structure being suspended from the bottom of the buoyant bag, or the like.

Another object is to provide a means whereby the wings of the airplane structure may be tilted, thus materially aiding the aircraft when rising or descending.

Still another object is to provide a novel propelling means for the buoyant bag, this means together with the lift of the wings of the airplane enabling the aircraft to travel with great speed.

Still another object is to provide a novel means of adjusting or tilting the wings of the airplane.

Other objects, advantages, and features of invention may appear from the accompanying drawing, the subjoined detailed description, and the appended claims.

In the drawing

Figure 1 is a side elevation of my improved aircraft.

Figure 2 is a fragmentary horizontal sectional view of the lower airplane construction.

Figure 3 is a fragmentary sectional view taken on line 3, 3 of Figure 2.

Figure 4 is a side elevation of one of the slides.

Figure 5 is a transverse sectional view taken on line 5, 5 of Figure 4.

Figure 6 is a longitudinal sectional view through the buoyant bag.

Figure 7 is a plan view of one of the airplane wings.

Figure 8 is a diagrammatic side elevation of the fuselage and wing.

Referring more particularly to the drawing, my aircraft comprises a buoyant bag 1 which is wholly or partly filled with a buoyant gas, or the like, and an airplane 2 which is suspended from the bottom of the bag 1. The gas in the bag 1 will be sufficient to wholly support its own weight and the weight of the airplane beneath or a sufficient lift will be provided so that if the motors should all stop that the entire craft would sink gradually. In other words, a partial lift is then provided by the bag.

The matter of constructing a buoyant bag such as a dirigible is well-known but with my arrangement I propose a novel driving means for the craft which consists in directing the flow of air from a propeller in the nose of the bag through a hood which throws the air stream close to the surface of the bag, and thence rearwardly where it moves rapidly into the space just vacated by the bag, causing a pressure which presses upon the rear of the bag to force it rapidly forward.

To accomplish this arrangement I provide a motor 3 in the nose of the bag 1 which motor is adapted to drive a propeller 4. A hood 5 extends rearwardly from the nose of the bag a considerable distance, the exact distance being immaterial for present purposes. The hood 5 converges towards the surface of the bag at the rear thereof, as shown at 6. This is for the purpose of providing a nozzle or jet-like action to the air which passes through the hood from the propeller 4.

At the front the hood is a greater distance from the exterior of the bag for the purpose of obtaining as much air as possible. As previously stated the air moves out of the hood with great velocity and moves rearwardly a considerable distance, and then a pressure occurs which acts upon the rear surfaces of the bag to force it forwardly. The hood 5 can be supported from the shell of the bag 1, from its metal reinforcing structure, or in any manner which is found suitable.

In lighter than air craft much difficulty is encountered due to the outward pressure of the gas and it is necessary at times to relieve this pressure by permitting the gas to escape into the air. This results in waste and also lessens the lifting capacity of the bag. In Figure 6 I have illustrated a novel means of relieving excessive pressures in the bag by means of one or more auxiliary bags 7 which are placed between the bulk-heads 8, or the like, across the upper surface of the bag. Similarly, I provide bags 9 at the bottom of the main dirigible bag.

The upper bags are provided with a relief port 10 and the lower bags are each provided with a relief port 11. The purpose of these relief ports is to permit a partial exhaustion of the air in the bags 7, 9 when there is excessive gas pressure within the main bag 1. The bags 7, 9 can be filled with air or any other suitable gas and thus a constant amount of buoyant gas is always retained within the dirigible. The bags 7, 9 are resilient and act as shock absorbers so that there is less likelihood of a rupture occurring in the structure of the dirigible.

The airplane 2 is suspended below the dirigible bag 1, as shown in Figure 1, and the interiors of the two structures are open so that the passengers can move from one to the other through the communicating and connecting structure 12.

The airplane 2 comprises a fuselage 13, a pair of horizontal extending lifting wings 14, 14, an elevator 15, the usual rudder 16, and a landing gear 17, which may be either pontoons, wheels, or a combination of both. A motor 18 is mounted on or in each of the wings 14 and if desired I may also provide a motor in the nose of the airplane.

For the purpose of assisting the rising or descent of my aircraft it is desirable that the wings 14 shall be tilted upwardly or downwardly, thus giving a greater upward or downward force so that the craft can be more readily maneuvered. The wings 14, 14 are adjusted in the following manner: In the sides of the fuselage 13 I provide a pair of slots 19, 20, the slot 19 being termed the rear slot and the slot 20 the forward slot. These slots are provided on both sides of the fuselage. In other words, one pair for each of the wings. A lower arcuate slot 21 is provided on each side of the fuselage, the purpose of which will be further described. For purposes of illustration, and I have also found that for practical use, it is desirable that the rear slot 19 shall be inclined 45 degrees from the horizontal and the slot 20 shall be inclined 30 degrees from the horizontal.

Adjacent each of the slots 19, 20 I provide a pair of grooved slide-ways 22, 23 and a plate 24 slides in the guide ways over the slots. A beam 25 extends through the two rear plates 24 and through the slots 19 and extend thence outwardly into the wings 14, and these beams may, if desired, form a part of the structural reinforcement of the wing. A beam 26 extends through the front slots 20 and through the front plates 24, and thence outwardly into the wings, in the same manner as previously described. Thus it will be seen that as the plates 24 are moved along their respective guide-ways that the wings will be tilted upwardly or downwardly, as shown in the diagrammatic view in Figure 8.

The simultaneous movement of the beams 25, 26 is accomplished in the following manner: A threaded bar 27 is journaled in the fuselage 13 and extends horizontally therein. This bar may be rotated by the pilot through a suitable gear train which includes the gear 28 on the end of the bar 27, a meshing gear 29, a shaft 30 extending from the gear 29 to the pilot's compartment. A rider 31 is adapted to move back and forth along the bar 27 depending on the direction of rotation of said bar.

A post 32 extends transversely across the fuselage and protrudes through the arcuate slots 21 on both sides of the fuselage. Reinforcing stays 33 are secured to the outer ends of the bar 32 and to the wings 14. A link 34 is secured to the rider 31 and to the post 32. That is, the link is pivoted to the post and is connected to the rider by a universal joint.

A girder 35 is journaled on both of the beams 25, 26 and there is one girder on each side of the fuselage. An arm 36 depends from each of the girders 35 and is pivoted to the post 32. A strut 37 is secured to the arm 36 and to the beam 26. Thus it will be seen that as the rider 31 is moved forwardly or rearwardly along the bar 27 that the plates 24 will be moved in their guideways, thus causing the wings 14 to be tilted upwardly or downwardly depending upon the movement of the plates.

I have so arranged the slots 19, 20 that there is a different ratio of travel of the leading and trailing edges of the wings. It is obvious that there is one angle of the wings at which they are most efficient when traveling in a horizontal direction. However, my wings are only adjusted away from this most efficient angle for the purpose of rising or descending, or sustaining loads.

My aircraft is stabilized by means of ailerons in the wings. I preferably provide an outer aileron and an inner aileron 38 and 39, respectively. These ailerons may be controlled in the well-known and usual manner or I may provide a control rod 40 which extends out through the slots 19, and an inner rod 41 may control the tip aileron. However, as previously stated, the method of controlling the ailerons may be varied.

The elevator 15 is controlled in the same manner as the wings 14, that is, by the same arrangement of slots, links, threaded posts, and so forth, as previously described.

A pipe coil 42 extends longitudinally through the bag 1 for the purpose of heating or cooling the gas therein and thus maintain a comparatively constant pressure within the bag.

Having described my invention, I claim:

1. In an aircraft including a bag, a buoyant gas in said bag, a propeller on the forward tip of said bag, means to rotate said propeller, and a hood over the forward end of said bag and spaced from the bag, an airplane suspended below said bag, wings on the airplane, means to tilt said wings, and motors on the wings of said airplane.

2. In an aircraft including a bag, a buoyant gas in said bag, a propeller on the forward tip of said bag, means to rotate said propeller, and a hood over the forward end of said bag and spaced from the bag, said hood being spaced a greater distance from the bag at the front of said hood than at the rear thereof, said hood extending rearwardly to a point approximately at the greatest diameter of said bag.

3. An aircraft comprising a bag, a buoyant gas in said bag, drive means on said bag, an airplane suspended below said bag, wings on the airplane, drive means on each of said wings, said aircraft including a fuselage, said fuselage having slots formed therein, plates slidably mounted within the fuselage over said slots, beams extending through said plates and slots and into the wings, and means to move said plates along the slots whereby said wings are tilted.

4. An aircraft comprising a bag, a buoyant gas in said bag, drive means on said bag, an airplane suspended below said bag, wings on the airplane, drive means on each of said wings, said aircraft including a fuselage, said fuselage having slots formed therein, plates slidably mounted within the fuselage over said slots, beams extending through said plates and slots and into the wings, a girder journaled on each of said beams and extending therebetween, an arm depending from each of the girders, a threaded bar journaled in the fuselage, means to rotate said bar, a rider on the bar, and means connecting said rider and said arms whereby said arm is swung and the girder is moved to actuate said plates and tilt the wings.

5. An aircraft comprising a bag, a buoyant gas in said bag, drive means on said bag, an airplane suspended below said bag, wings on the airplane, drive means on each of said wings, said aircraft including a fuselage, said fuselage having slots formed therein, plates slidably mounted within the fuselage over said slots, beams extending through said plates and slots and into the wings, a girder journaled on each of said beams and extending therebetween, an arm depending from each of the girders, a threaded bar journaled in the fuselage, means to rotate said bar, a rider on the bar, and means connecting said rider and said arms whereby said arm is swung and the girder is moved to actuate said plates and tilt the wings, said fuselage having arcuate slots formed therein below said first named slots, a post extending through said arcuate slots, said post being secured to said arms, and a link pivoted to said post and secured to said rider by a universal joint.

In testimony whereof, I affix my signature.

JOHN W. S. HODGDON.